(12) United States Patent
Murata

(10) Patent No.: US 11,718,248 B2
(45) Date of Patent: Aug. 8, 2023

(54) WIRE HARNESS AND WIRE HARNESS ROUTING STRUCTURE

(71) Applicant: SUMITOMO WIRING SYSTEMS, LTD., Mie (JP)

(72) Inventor: Takahiro Murata, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/798,543

(22) PCT Filed: Feb. 20, 2020

(86) PCT No.: PCT/JP2020/006686
§ 371 (c)(1),
(2) Date: Aug. 9, 2022

(87) PCT Pub. No.: WO2021/166141
PCT Pub. Date: Aug. 26, 2021

(65) Prior Publication Data
US 2023/0078890 A1 Mar. 16, 2023

(51) Int. Cl.
*B60R 16/023* (2006.01)
*B60R 16/02* (2006.01)

(52) U.S. Cl.
CPC ........ *B60R 16/0215* (2013.01); *B60R 16/023* (2013.01)

(58) Field of Classification Search
CPC .......................... H02G 3/0456; B60R 16/0215
USPC ....................................................... 174/72 A
See application file for complete search history.

(56) References Cited

U.S. PATENT DOCUMENTS

| 9,545,888 B2* | 1/2017 | Ito .......................... H01B 9/006 |
| 10,279,756 B2* | 5/2019 | Hayakawa ............. H01B 9/003 |
| 10,741,306 B2* | 8/2020 | Kobayashi ................ B60T 8/17 |
| 2003/0083797 A1* | 5/2003 | Yokoyama ............ B60T 13/741 303/20 |
| 2007/0234559 A1* | 10/2007 | Tokuda ............... B60R 16/0215 140/92.1 |
| 2013/0277087 A1* | 10/2013 | Hayakawa .......... B60R 16/0215 174/107 |
| 2015/0076790 A1* | 3/2015 | Sugimoto ................. F16L 3/06 280/283 |
| 2016/0016451 A1* | 1/2016 | Izak ........................ B60G 3/20 280/5.503 |

FOREIGN PATENT DOCUMENTS

JP  2016-092940 A  5/2016

OTHER PUBLICATIONS

International Search Report dated Apr. 28, 2020 for WO 2021/166141 A1 (4 pages).

* cited by examiner

*Primary Examiner* — Timothy J Thompson
*Assistant Examiner* — Michael F McAllister
(74) *Attorney, Agent, or Firm* — Venjuris, P.C.

(57) ABSTRACT

It is an object to make a wire harness for connecting a vehicle body-side device and a wheel-side device suited to routing in a small space, and improve its flex resistance. A wire harness for connecting a vehicle body-side device and a wheel-side device includes: a first wiring member; and a second wiring member, and at least part of an outer path portion of the first wiring member, and at least part of an outer path portion of the second wiring member are separated from each other outside a vehicle body.

8 Claims, 2 Drawing Sheets

WIRE HARNESS AND WIRE HARNESS ROUTING STRUCTURE

CROSS REFERENCE TO RELATED APPLICATIONS

This application is a national phase of PCT application No. PCT/JP2020/006686, filed on 20 Feb. 2020, of which is incorporated herein by reference.

TECHNICAL FIELD

The present disclosure relates to a wire harness and a wire harness routing structure.

BACKGROUND

Patent Document 1 discloses a composite cable obtained by integrally covering an electric brake cable and an ABS sensor cable with an external sheath.

PRIOR ART DOCUMENT

Patent Document

Patent Document 1: JP 2013-237428 A

SUMMARY OF THE INVENTION

Problems to be Solved

In a wire harness for connecting a vehicle body-side device and a wheel-side device, it is desired to make the wire harness more suited to routing in a small space, and further improve its flex resistance.

Accordingly, it is an object of the present disclosure to make a wire harness for connecting a vehicle body-side device and a wheel-side device suited to routing in a small space, and improve its flex resistance.

Means to Solve the Problem

A wire harness according to the present disclosure relates to a wire harness for connecting a vehicle body-side device and a wheel-side device to each other, the wire harness including: a first wiring member; and a second wiring member, wherein at least part of an outer path portion of the first wiring member, and at least part of an outer path portion of the second wiring member are separated from each other outside a vehicle body.

A routing structure of a wire harness according to the present disclosure relates to a routing structure of a wire harness for connecting a vehicle body-side device and a wheel-side device, wherein the wire harness includes: a first wiring member; and a second wiring member, and the first wiring member and the second wiring member are routed such that at least part of an outer path portion of the first wiring member, and at least part of an outer path portion of the second wiring member serve as separate paths outside a vehicle body.

Effect of the Invention

According to the present disclosure, it is possible to make a wire harness for connecting a vehicle body-side device and a wheel-side device suited to routing in a small space, and improve its flex resistance.

DETAILED DESCRIPTION TO EXECUTE THE INVENTION

Description of Embodiments of Present Disclosure

Figure 1:
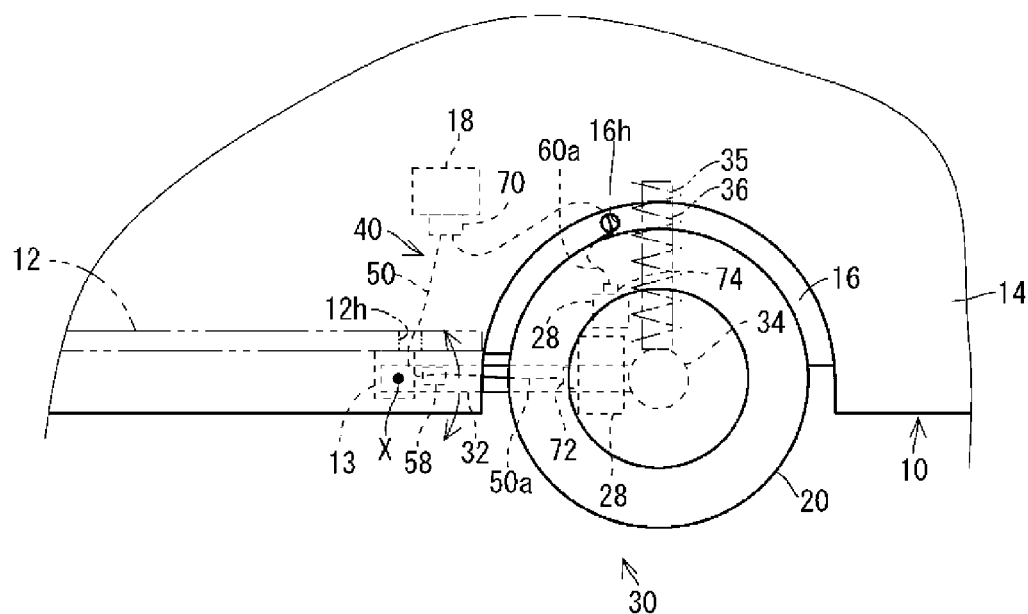
FIG. 1 is a schematic side view illustrating a wire harness routing structure according to an embodiment.

First, embodiments of the present disclosure will be listed and described.

The wire harness according to the present disclosure is as follows.

(1) A wire harness for connecting a vehicle body-side device and a wheel-side device to each other, the wire harness includes: a first wiring member; and a second wiring member, wherein at least part of an outer path portion of the first wiring member, and at least part of an outer path portion of the second wiring member are separated from each other outside a vehicle body. According to the wire harness, since at least part of the outer path portion of the first wiring member, and at least part of the outer path portion of the second wiring member are separated from each other outside the vehicle body, the wire harness has higher flex resistance compared to when the first and second wiring members are bundled together, and the first and second wiring members are easily to be routed in a small space separately. Accordingly, the wire harness as a whole can be made suited to routing in a small space, and can have an improved flex resistance.

(2) In the wire harness of (1), the first wiring member may include a signal wire, the second wiring member may include a power supply wire, and the first wiring member may have an outer path length that is greater than an outer path length of the second wiring member. The signal wire can be easily routed with an outer path length greater than the outer path length of the power supply wire. The power supply wire can be easily routed with an outer path length shorter than the outer path length of the signal wire.

(3) In the wire harness of (1) or (2), a wire included in the first wiring member may be thinner than a wire included in the second wiring member, and the first wiring member may have an outer path length that is greater than an outer path length of the second wiring member. The first wiring member including a thin wire can easily be routed with an outer path length greater than the outer path length of the second wiring member including a thick wire. The second wiring member including a thick wire can easily be routed with an outer path length shorter than the outer path length of the first wiring member.

(4) In the wire harness of any one of (1) to (3), ends of the first wiring member and the second wiring member on at least one side may be connected to a common connector. The first wiring member and the second wiring member connected to a common connector can be routed along separate paths outside the vehicle body according to their flex resistance.

(5) In the wire harness of any one of (1) to (4), a bracket may be attached to the first wiring member, the bracket being able to be attached to an arm that supports a wheel so that the wheel is movable in an up-down direction. The first wiring member can be supported along the arm. Therefore, the first wiring member can easily be routed along a path that avoids a path on which bending is likely to occur.

(6) In the wire harness of (5), the bracket may be attached to a position of the arm that is close to a rotation axis of the arm on a vehicle body side. The first wiring member can easily be routed along a path that avoids a path on which bending is more likely to occur.

The wire harness routing structure according to the present disclosure is as follows.

(7) In a routing structure of a wire harness for connecting a vehicle body-side device and a wheel-side device, the wire harness includes: a first wiring member; and a second wiring member, and the first wiring member and the second wiring member are routed such that at least part of an outer path portion of the first wiring member, and at least part of an outer path portion of the second wiring member serve as separate paths outside a vehicle body. Since the first wiring member and the second wiring member are routed such that at least part of an outer path portion of the first wiring member, and at least part of an outer path portion of the second wiring member serve as separate paths outside a vehicle body, the wire harness has higher flex resistance compared to when the first and second wiring members are bundled together, and the first and second wiring members are easily to be routed in a small space separately. Accordingly, the wire harness as a whole can be made suited to routing in a small space, and can have an improved flex resistance.

(8) In the routing structure of the wire harness of (7), ends of the first wiring member and the second wiring member on at least one side may be connected to a common connector. The first wiring member and the second wiring member connected to a common connector are routed along separate paths outside the vehicle body.

(9) In the routing structure of the wire harness of (7) or (8), the first wiring member may be routed along at least a portion of an arm, the arm supporting a wheel so that the wheel is movable in an up-down direction. The first wiring member is routed along the arm. Therefore, the first wiring member can easily be routed along a path that avoids a path on which bending is likely to occur.

(10) In the routing structure of the wire harness of (9), the first wiring member may extend over a position of the arm that is close to a rotation axis of the arm when the arm is supported on the vehicle body. The first wiring member can easily be routed along a path that avoids a path on which bending is more likely to occur.

Detail of Embodiments of Present Disclosure

Hereinafter, specific examples of the wire harness and the wire harness routing structure of the present disclosure will be described with reference to the drawings. Note that the present disclosure is not limited to the examples but is defined by the claims, and all modifications within the meaning and scope equivalent to the claims are intended to be included.

Embodiments

Figure 2:
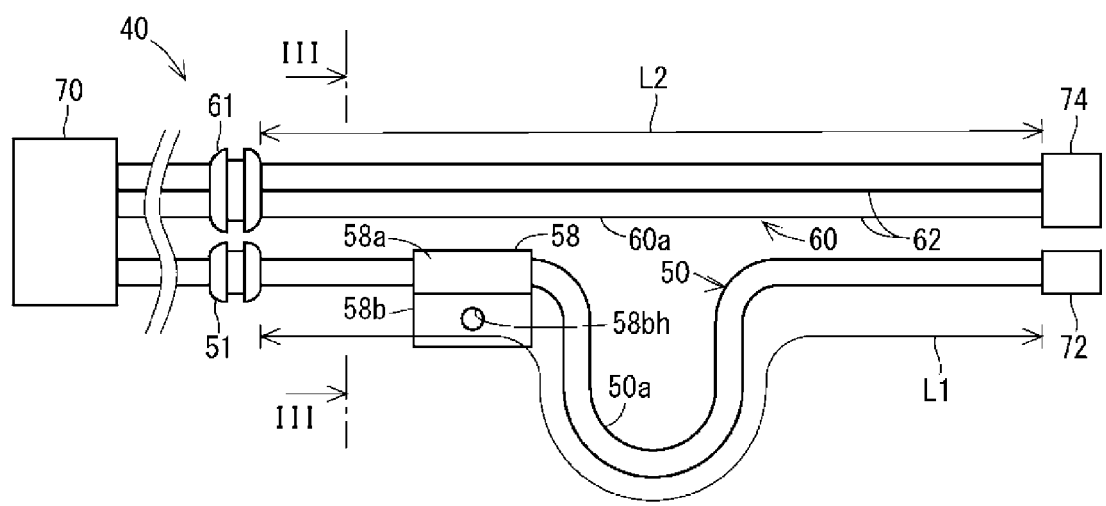
FIG. 2 is a schematic view illustrating a wire harness.
Figure 3:
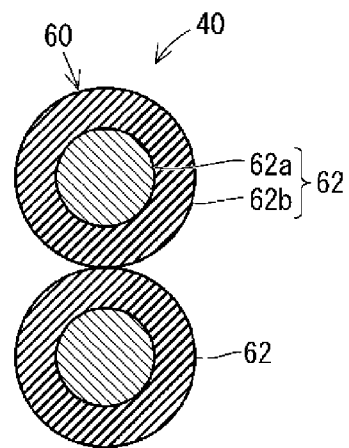
FIG. 3 is a cross-sectional view taken along a line in FIG. 2.
Figure 3:
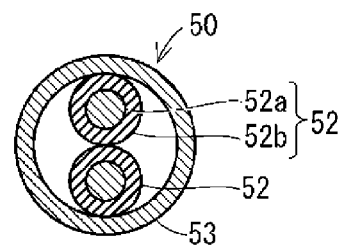

The following will describe the wire harness and the wire harness routing structure according to the embodiments. FIG. 1 is a schematic side view illustrating a routing structure 30 of a wire harness 40. FIG. 2 is a schematic view illustrating the wire harness 40. FIG. 3 is a cross-sectional view taken along a line in FIG. 2.

The wire harness 40 is a wiring member that connects a vehicle body-side device 18 and a wheel-side device 28 to each other. The wire harness 40 is attached to a vehicle body 10 while being routed along a path that connects the vehicle body-side device 18 and the wheel-side device 28.

The vehicle body 10 is a vehicle body of an automobile. FIG. 1 shows a portion of the vehicle body 10 that is located in the periphery of a wheel 20. The vehicle body 10 includes a floor part 12 and a body part 14. The floor part 12 is a part that faces the ground. The body part 14 is provided on the upper side of the floor part 12, and serves as the exterior of the vehicle body 10. The vehicle body 10 may be a monocoque body in which a rigid frame and a body are formed as one piece, or may have a configuration in which a body is installed on a frame. Note that in the following description, "front" may refer to the travel direction in which an automobile typically travels, and "rear" may refer to the opposite side thereof.

The wheel 20 is supported on the vehicle body 10 so as to be rotatable. In the example shown in FIG. 1, the wheel 20 is supported within a fender apron 16 so as to be rotatable. A suspension device may be a device that supports the wheel 20 using a suitable suspension system such as a rigid axle suspension system, an independent suspension system, or a torsion beam suspension system. In the example shown in FIG. 1, an arm 32 supports the wheel 20. More specifically, the arm 32 is provided extending in the front-rear direction of the vehicle body 10. Here, a base end portion of the arm 32 extends forward relative to the wheel 20. The base end portion of the arm 32 is supported by a vehicle body-side support portion 13 so as to be swingable. An axis X around which the base end portion of the arm 32 swings is a rotation axis X of the arm 32 on the vehicle body 10 side around which the arm 32 swings. In the present embodiment, the rotation axis X extends along the left-right direction of the vehicle body 10. The base end portion of the arm may also be supported on the floor part at a position located obliquely forward, inward, obliquely rearward, or rearward of the wheel, or the like, so as to be swingable. In these cases, the rotation axis of the arm on the vehicle body side around which the arm swings may extend along the left-right direction or the front-rear direction of the vehicle body, or may extend along an oblique direction relative to both the left-right direction and the front-rear direction.

A leading end portion of the arm 32 extends (here, rearward) from the vehicle body-side support portion 13 into the fender apron 16. A bearing part 34 is provided at the leading end portion of the arm 32. The wheel 20 is supported by the bearing part 34 so as to be rotatable within the fender apron 16. A spring 35 and a damper 36 are provided between the leading end portion of the arm 32, and the vehicle body 10.

As described above, since the base end portion of the arm 32 is supported by the vehicle body-side support portion 13 so as to be swingable, the arm 32 supports the wheel 20 so that the wheel 20 can move in the up-down direction within the fender apron 16. In a state in which the moving direction of the wheel 20 is restricted by the arm 32, the spring 35 and the damper 36 are interposed between the leading end portion of the arm 32 and the vehicle body 10. The spring 35 and the damper 36 absorb an impact resulting from unevenness in a road when the vehicle is travelling.

The vehicle body-side device 18 is provided on the vehicle body 10, and the wheel-side device 28 is provided on the wheel 20. The wheel-side device 28 is a device that is incorporated into the wheel 20, and moves together with the wheel 20 in the up-down direction with respect to the vehicle body 10. It is envisioned that the wheel-side device 28 is a sensor, an electric-powered brake, a traveling motor, or the like. The sensor is, for example, a sensor for detecting the rotational speed of the wheel. The electric-powered brake is a brake that includes a motor and the like, and brakes the rotation of the wheel 20 using electricity as power. The electric-powered brake may be an electric-powered parking brake that is used when the automobile is stopped and parked, or a brake that is used when the automobile is travelling. The traveling motor is a so-called in-wheel motor that is incorporated into the wheel 20 and rotates the wheel 20. The vehicle body-side device 18 is a device that transmits and receives signals to and from the wheel-side device 28, and supplies power to the wheel-side device 28. For example, the vehicle body-side device 18 is an ECU (Electronic Control Unit) that receives a signal from the sensor and controls the electric-powered brake or the traveling motor. The vehicle body-side device 18 may be provided inside the vehicle body 10, or may be provided outside the vehicle body 10. Here, the vehicle body-side device 18 is provided inside the vehicle body 10.

In the present embodiment, an example is given in which the vehicle body-side device 18 is provided inside the vehicle body 10, and two wheel-side devices 28 are provided on the wheel 20. A plurality of vehicle body-side devices 18 may also be provided on the vehicle body. One or three or more wheel-side devices may also be provided on the wheel. Also, in the present embodiment, an example is given in which one end portion of the wire harness 40 is connected to the vehicle body-side device 18, and the other end portion thereof is connected to the wheel-side devices 28. One end portion of the wire harness 40 may also be connected to the vehicle body-side device via another wire harness.

The wire harness 40 includes a first wiring member 50 and a second wiring member 60. At least part of an outer path portion 50a of the first wiring member 50 and at least part of an outer path portion of the second wiring member 60 are separated from each other so as to be separately routable outside the vehicle body 10. Here, at least part of an outer path portion 50a of the first wiring member 50 and at least part of an outer path portion of the second wiring member 60 are separated from each other outside the vehicle body 10. Here, portions of the wiring members 50 and 60 that extend outside the vehicle body 10 are defined as the outer path portions 50a and 60a, respectively. That is to say, the outer path portions 50a and 60a of the wiring members 50 and 60 are portions between the vehicle body 10 and the wheel 20 in which bending deformation may occur due to displacement of the wheel 20 relative to the vehicle body 10. Depending on the paths of the wiring members 50 and 60 of the automobile, the entirety of the wiring members 50 and 60 may serve as the outer path portions, or portions of the wiring members 50 and 60 may serve as the outer path portions. In the present embodiment, since the vehicle body-side device 18 is provided inside the vehicle body 10, the wiring members 50 and 60 are guided to the wheel 20 from the inside of the vehicle body 10 via the outside of the vehicle body 10. Accordingly, portions of the wiring members 50 and 60 serve as the outer path portions 50a and 60a.

The outer path portion 50a and the outer path portion 60a are not bundled together by a sheath, a corrugated tube, an adhesive tape, or the like. Therefore, the outer path portion 50a and the outer path portion 60a are separated from each other, and are routable along separate paths. Note that the first wiring member 50 and the second wiring member 60 may also be bundled together inside the vehicle body 10. FIG. 1 shows an example in which the entirety of the outer path portion 50a and the entirety of the outer path portion 60a are separated from each other outside the vehicle body 10. A configuration is also possible in which one part of the outer path portion 50a and one part of the outer path portion 60a are separated from each other outside the vehicle body 10, and another part of the outer path portion 50a and another part of the outer path portion 60a are not separated from each other but are bundled together.

The outer path portion 50a and the outer path portion 60a are thin compared to when they are bundled together. Therefore, each of the outer path portion 50a and the outer path portion 60a can be easily routed in a relatively small space. Also, the outer path portion 50a and the outer path portion 60a are both easy to bend compared to when they are bundled together.

More specifically, the second wiring member 60 is drawn out to the outside through a hole 16h formed in the fender apron 16. The hole 16h may be formed in a portion of the fender apron 16 that is located on the outer side in the radial direction of the wheel 20 thereof, or may be formed in a portion of the fender apron 16 that is located on the inner side in the width direction of the wheel 20 thereof. The first wiring member 50 is drawn out to the outside through a hole 12h formed in the floor part 12 of the vehicle body 10. The hole 12h is formed in a portion of the floor part 12 that is located in the periphery of the vehicle body-side support portion 13. The hole 12h may be formed in a portion of the floor part 12 that is located between the wheel 20 and the vehicle body-side support portion 13, or may be formed in the remaining portion of the floor part 12.

Grommets 51 and 61 are provided in midway portions in the longitudinal direction of the wiring members 50 and 60. The grommets 51 and 61 are annular members made of an elastic material such as rubber, and are externally fitted to the respective wiring members 50 and 60. The grommets 51 and 61 may also be provided with, in the outer circumferential portions thereof, an annular groove to which the edge of the corresponding hole 12h or 16h is fitted. The grommet 51, 61 is interposed between the wiring member 50, 60 and a hole or gap formed in the vehicle body 10, and can protect the wiring member 50, 60 and prevent the entrance of water.

In the present embodiment, a portion of the first wiring member 50 starting from the grommet 51 to an end connected to the wheel-side device 28 serves as the outer path portion 50a. A portion of the second wiring member 60 starting from the grommet 61 to an end connected to the wheel-side device 28 serves as the outer path portion 60a. The outer path portions of the wiring members 50 and 60 do not necessarily need to be defined based on the grommets, and may also be defined based on brackets used to attach the wiring members 50 and 60 to the vehicle body, the state in which the wiring members 50 and 60 are attached to the vehicle body 10, or the like.

The first wiring member 50 includes first wires 52. The first wires 52 are signal wires, for example. If, for example, the first wiring member 50 is connected to a sensor, the first wires 52 may be signal wires for outputting a detection signal of the sensor. The first wires 52 may also be signal wires for transmitting a control signal. The first wiring member 50 may include only signal wires.

The second wiring member 60 includes second wires 62. The second wires 62 are power supply wires, for example. If the second wiring member 60 is connected to an electric-powered brake, the second wires 62 may be power supply wires for supplying power to drive the electric-powered brake. If, for example, the second wiring member 60 is connected to a traveling motor, the second wires 62 may be power supply wires for supplying power to drive the traveling motor. The second wiring member 60 may include only power supply wires.

Also, the first wires 52 included in the first wiring member 50 may be thinner than the second wires 62 included in the second wiring member 60. In this case, the conductor cross-sectional area of the first wires 52 can be made smaller than the conductor cross-sectional area of the second wires 62, according to the thickness of the wires. Therefore, as described above, the first wires 52 are suited to being signal wires, and the second wires 62 are suited to being power supply wires.

Note that the first wiring member 50 may also include first wires 52 having different thicknesses. The second wiring member 60 may also include second wires 62 having different thicknesses. In this case, it is sufficient that the thickest wire of the first wires 52 included in the first wiring member 50 is thinner than the thinnest wire of the second wires 62 included in the second wiring member 60. Also, the thickness of a wire is preferably evaluated based on the dimensions of the lateral cross-sectional area (cross-sectional area of a surface orthogonal to the axis of the wire) including the core wire and the covering.

The first wires 52 included in the first wiring member 50 each include a core wire 52a and a covering 52b. The core wire 52a is made of copper, a copper alloy, aluminum, an aluminum alloy, or the like. The core wire 52a may be constituted by an assembly of a plurality of bare wires (typically, a twisted assembly), or may be constituted by a single bare wire. The covering 52b is formed by extruding a resin around the core wire 52a and covering the core wire 52a with the resin, for example.

A sheath 53 is formed around the first wires 52. The sheath 53 is a resin that covers the first wires 52. The sheath 53 is formed by extruding a resin around the first wires 52 and covering the first wires 52 with the resin, for example.

Note that the first wiring member 50 does not necessarily include a plurality of first wires 52. The first wires 52 are not necessarily covered by the sheath 53. A configuration is also possible in which the first wires 52 are covered with an adhesive tape wound in a spiral shape, a corrugated tube, or a rubber tube, or the like. There may also be a portion in which the first wires 52 are not bundled together in the extending direction of the first wiring member 50.

Also, a bracket 58 is provided in a midway portion in the longitudinal direction of the first wiring member 50. The bracket 58 is formed by pressing a metal plate, for example. The bracket 58 includes a wire attaching portion 58a and an arm-side attaching portion 58b. The wire attaching portion 58a is a portion that is attached to the first wires 52. Here, the wire attaching portion 58a is attached to the first wiring member 50 by being subjected to plastic deformation to surround the sheath 53 provided around the first wires 52. The arm-side attaching portion 58b is a portion that is attached to the arm 32. Here, the arm-side attaching portion 58b has a screw hole 58bh, and when a screw protruding on the arm 32 is inserted into the screw hole 58bh and a nut is screwed onto the screw, the arm-side attaching portion 58b is attached to the arm 32. The bracket 58 may also be attached to the first wiring member 50 using a screwing structure or the like. The bracket 58 may also be attached to the arm 32 using welding, a fitting structure, or the like.

The bracket 58 may be attached to a position of the arm 32 that is close to the rotation axis X of the arm 32 on the vehicle body 10 side. The position of the arm 32 that is close to the rotation axis X thereof on the vehicle body 10 side refers to a position close to the rotation axis X relative to the center of the arm 32 in the longitudinal direction. Assuming that the arm 32 is quartered along the longitudinal direction thereof, the bracket 58 may also be provided in the quartered region of the arm 32 that is closest to the rotation axis X. The bracket 58 may also be attached to the same position of the arm 32 as the rotation axis X in the longitudinal direction of the arm 32. As a result of the bracket 58 being attached to a position of the arm 32 that is close to the rotation axis X, the first wiring member 50 is routed along at least a part of the arm 32 via the position of the arm 32 that is close to the rotation axis X.

The second wires 62 included in the second wiring member 60 each include a core wire 62a and a covering 62b. The core wire 62a has the same configuration as that of the core wire 52a, and the covering 62b has the same configuration as that of the covering 52b. Here, as described above, the first wires 52 are thinner than the second wires 62.

No exterior member such as a sheath is provided around the second wires 62. However, a configuration is also possible in which an exterior member such as a sheath, an adhesive tape wound in a spiral shape, a corrugated tube, or a rubber tube is provided around the second wires 62.

The second wires 62 may be bundled together in a partial portion or in the entire region in the longitudinal direction thereof. For example, as a result of the second wires 62 being inserted through the grommet 61, which will be described below, the second wires 62 are bundled together.

An outer path length L1 of the first wiring member 50 is greater than an outer path length L2 of the second wiring member 60. Here, the lengths of the outer path portions 50a and 60a are the outer path lengths L1 and L2, respectively. Here, as described above, the first wiring member 50 extends to the outside of the vehicle body 10 through the hole 12h, detours to pass along the arm 32, and reaches the wheel-side device 28. Therefore, the outer path length L1 of the outer path portion 50a of the first wiring member 50 is greater than the linear distance between the hole 12h and the wheel-side device 28 by a distance corresponding to the detour. In contrast, the second wiring member 60 can reach the wheel-side device 28 without detouring from the hole 16h formed in the vicinity of the wheel 20. Accordingly, the outer path length L2 of the outer path portion 60a of the second wiring member 60 can be equal to the linear distance between the hole 12h and the wheel-side device 28 in a state in which the wheel 20 is at the farthermost position from the vehicle body 10. Therefore, the outer path length L1 of the first wiring member 50 is greater than the outer path length L2 of the second wiring member 60.

Note that in the present embodiment, the entire length of the first wiring member 50 is greater than the entire length of the second wiring member 60. However, if the lengths of the wiring members 50 and 60 within the vehicle body 10 are different from each other, the entire length of the first wiring member 50 and the entire length of the second wiring member 60 may also be equal to each other, or the relationship between the longer and shorter wiring members may also be reversed.

Ends of the first wiring member 50 and the second wiring member 60 on one side are connected to a common connector 70. The connector 70 has a connector housing made of a resin or the like. Terminals at the ends of the first wires 52 and terminals at the ends of the second wires 62 are inserted into a cavity formed in the connector housing. As a result of the connector 70 being connected to the vehicle body-side device 18, the vehicle body-side device 18, and the first wiring member 50 and the second wiring member 60 are connected to each other.

One end of the first wiring member and one end of the second wiring member may also be connected to separate connectors. A configuration is also possible in which at least either of the one end of the first wiring member and the one end of the second wiring member is directly connected to electric components within the vehicle body-side device, without being connected thereto via a connector.

The other end of the first wiring member 50 is connected to a connector 72, and the other end of the second wiring member 60 is connected to a connector 74, which is different from the connector 72. Similar to the connector 70, the connectors 72 and 74 have a connector housing made of a resin or the like, and terminals at the ends of the first wires 52 or the second wires 62 are inserted into the corresponding connector housing. As a result of the connectors 72 and 74 being connected to the respective wheel-side devices 28, the first wiring member 50 and the second wiring member 60 are separately connected to the respective wheel-side devices 28.

The other end of the first wiring member 50 and the other end of the second wiring member 60 may also be connected to a common connector. A configuration is also possible in which at least either of the other end of the first wiring member and the other end of the second wiring member is directly connected to electric components within the wheel-side device, without being connected thereto via a connector.

The wire harness 40 is routed between the vehicle body 10 and the wheel 20 in the automobile in the following manner. That is to say, the vehicle body-side device 18 is provided inside the vehicle body 10. In FIG. 1, the vehicle body-side device 18 is located at an intermediate position between the holes 12h and 16h. The connector 70 is connected to the vehicle body-side device 18. The first wiring member 50 protruding from the connector 70 extends toward the hole 12h formed in the floor part 12, passes through the hole 12h, and is drawn out to the outside of the vehicle body 10. Here, the grommet 51 attached to the first wiring member 50 is fitted to the hole 12h. The outer path portion 50a of the first wiring member 50 extends along the arm 32 from the position close to the rotation axis X of the arm 32 toward the leading end of the arm 32. Then, the connector 72 is connected to the wheel-side device 28. The outer path portion 50a is attached to the arm 32 so as to be routed along the arm 32. Here, the outer path portion 50a is attached by the bracket 58 to a position of the arm 32 that is close to the rotation axis X. The second wiring member 60 protruding from the connector 70 extends toward the hole 16h formed in the fender apron 16, passes through the hole 16h, and is drawn out to the outside of the vehicle body 10. Here, the grommet 61 attached to the second wiring member 60 is fitted to the hole 16h. The outer path portion 60a of the second wiring member 60 extends downward from the hole 16h and reaches the inside of the wheel 20. Then, the connector 74 is connected to the wheel-side device 28. The outer path portion 60a is routed so as to span the space between the hole 16h and the wheel-side device 28 (connector 74).

According to the wire harness 40 and the routing structure 30 of the wire harness 40 having the above-described configurations, at least part of the outer path portion 50a of the first wiring member 50, and at least part of the outer path portion 60a of the second wiring member 60 are separated from each other outside the vehicle body 10. Accordingly, as compared to a case where the outer path portions 50a and 60a are bundled together into a thick bundle, the outer path portion 50a and the outer path portion 60a can be easily bent separately, and have higher flex resistance. Also, if the outer path portions 50a and 60a are bundled together into a thick bundle, a large routing space will be required correspondingly. In the present embodiment, the outer path portion 50a and the outer path portion 60a can be routed separately in small routing spaces, and thus can also be routed easily in small routing spaces. Accordingly, the wire harness 40 as a whole can be made suited to routing in a small space, and can have improved flex resistance.

Also, when the first wiring member 50 includes the first wires 52 serving as signal wires, and the second wiring member 60 includes the second wires 62 serving as power supply wires, the first wiring member 50 that includes signal wires, which are likely to curve, can easily be routed with a long outer path length L1. Also, power supply wires, which are not likely to curve, can easily be routed with a short outer path length L2. Also, since the power supply wires and the signal wires are routed separately, it is also possible to suppress the influence of noise between them.

Also, when the first wires 52 included in the first wiring member 50 are thinner than the second wire 62 included in the second wiring member 60, the first wiring member 50 that includes the first wires 52, which are thin and are likely to curve, can easily be routed with a long outer path length L1. Also, the first wiring member 50 including the thin first wires 52 can easily be routed in a small space with a long outer path length L1. Also, it is difficult to route the second wiring member 60 including the second wires 62, which are thick and are not likely to curve, in a small space. Accordingly, by routing the second wiring member 60 with a short outer path length L2, the second wiring member 60 can also be routed easily.

The thickness of the entire first wiring member 50 may be smaller than the thickness of the entire second wiring member 60. In this case, the thicknesses of the wiring members 50 and 60 may also be evaluated based on the dimension of a circumferential length of the wiring members 50 and 60 measured by winding a tape measure around the circumferences of the wiring members 50 and 60.

Also, when the ends of the first wiring member 50 and the second wiring member 60 on at least one side are connected to the common connector 70, it is possible to route the first wiring member 50 and the second wiring member 60 along separate paths according to their flex resistances and the like.

Also, if the first wiring member 50 is supported by the bracket 58 along the arm 32, the first wiring member 50 can be easily routed along a detour path that extends along the arm 32. Accordingly, the first wiring member 50 is likely to be routed along a path that avoids a path on which bending is likely to occur.

Also, if the bracket 58 is provided close to the rotational axis X, the first wiring member 50 will extend over a position of the arm 32 that is close to the rotational axis X, thus making it possible to further prevent bending deformation of the first wiring member 50 that may occur due to up-down movement of the wheel 20.

Figure 4:
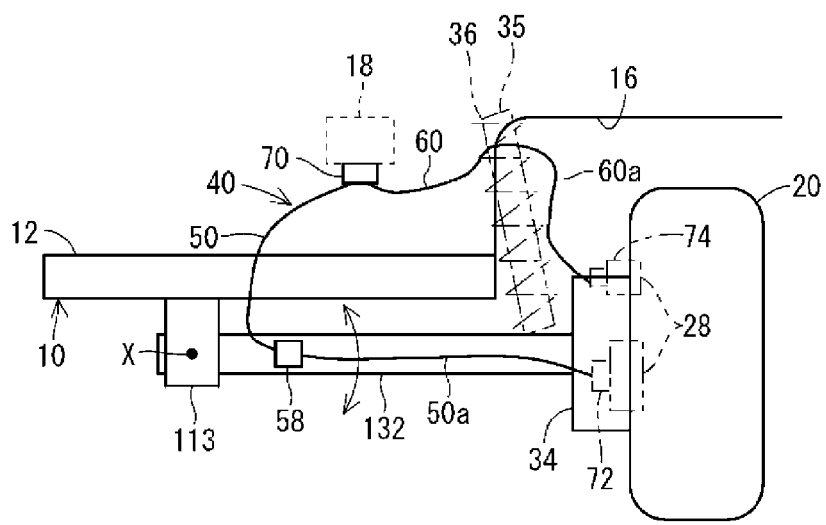
FIG. 4 is a schematic side view illustrating a wire harness routing structure according to a modification.

Note that the suspension device that supports the wheel 20 with respect to the vehicle body 10 is not limited to the above-described example. For example, as shown in FIG. 4, the base end portion of an arm 132 that corresponds to the arm 32 may extend inward the wheel 20 in the width direction. The base end portion of the arm 132 is supported at a position inside the wheel 20 in the width direction, so as to be swingable by a vehicle body-side support portion 113 provided on the floor part 12. In this case, an axis X around which the base end portion of the arm 132 swings extends along the front-rear direction of the vehicle body 10.

Also in this case, similar to the above-described embodiment, a configuration is also possible in which the bracket 58 of the first wiring member 50 is fixed to the arm 132, and at least part of the outer path portion 50a of the first wiring member 50 is routed along the arm 132.

With the present modification, it is also possible to realize the same functions and effects as those of the above-described embodiment.

Note that the above-described embodiments and modifications can be freely combined unless they contradict each other.

LIST OF REFERENCE NUMERALS

10 Vehicle body
12 Floor part
12h Hole
13 Vehicle body-side support portion
14 Body part
16 Fender apron
16h Hole
18 Vehicle body-side device
20 Wheel
28 Wheel-side device
30 Routing structure
32 Arm
34 Bearing part
35 Spring
36 Damper
40 Wire harness
50 First wiring member
50a Outer path portion
51 Grommet
52 First wire
52a Core wire
52b Covering
53 Sheath
58 Bracket
58a Wire attaching portion
58b Arm-side attaching portion
58bh Screw hole
60 Second wiring member
60a Outer path portion
61 Grommet
62 Second wire
62a Core wire
62b Covering
70 Connector
72 Connector
74 Connector
113 Vehicle body-side support portion
132 Arm
L1 Outer path length
L2 Outer path length
X Rotation axis

What is claimed is:

1. A wire harness for connecting a vehicle body-side device and a wheel-side device to each other, the wire harness comprising:

a first wiring member; and a second wiring member, wherein at least part of an outer path portion of the first wiring member, and at least part of an outer path portion of the second wiring member are separated from each other outside a vehicle body, and a bracket is attached to the first wiring member, the bracket being able to be attached to an arm that supports a wheel so that the wheel is movable in an up-down direction.

2. The wire harness according to claim 1, wherein the first wiring member includes a signal wire, the second wiring member includes a power supply wire, and the first wiring member has an outer path length that is greater than an outer path length of the second wiring member.

3. The wire harness according to claim 1, wherein a wire included in the first wiring member is thinner than a wire included in the second wiring member, and the first wiring member has an outer path length that is greater than an outer path length of the second wiring member.

4. The wire harness according to claim 1, wherein ends of the first wiring member and the second wiring member on at least one side are connected to a common connector.

5. The wire harness according to claim 1, wherein the bracket is attached to a position of the arm that is close to a rotation axis of the arm on a vehicle body side.

6. A routing structure of a wire harness for connecting a vehicle body-side device and a wheel-side device, wherein the wire harness comprises: a first wiring member; and a second wiring member, the first wiring member and the second wiring member are routed such that at least part of an outer path portion of the first wiring member, and at least part of an outer path portion of the second wiring member serve as separate paths outside a vehicle body, and the first wiring member is routed along at least a portion of an arm, the arm supporting a wheel so that the wheel is movable in an up-down direction.

7. The routing structure of the wire harness according to claim 6, wherein ends of the first wiring member and the second wiring member on at least one side are connected to a common connector.

8. The routing structure of the wire harness according to claim 6, wherein the first wiring member extends over a position of the arm that is close to a rotation axis of the arm when the arm is supported on the vehicle body.

\* \* \* \* \*